US012385307B2

(12) United States Patent
Liu

(10) Patent No.: US 12,385,307 B2
(45) Date of Patent: Aug. 12, 2025

(54) AUTOMATIC RESET DEVICE FOR DOOR

(71) Applicant: Xiaojie Liu, Dalian (CN)

(72) Inventor: Xiaojie Liu, Dalian (CN)

(73) Assignee: TDK DOORS INC., Vancouver (CA)

( * ) Notice: Subject to any disclaimer, the term of this patent is extended or adjusted under 35 U.S.C. 154(b) by 103 days.

(21) Appl. No.: 18/512,136

(22) Filed: Nov. 17, 2023

(65) Prior Publication Data

US 2025/0163744 A1 May 22, 2025

(51) Int. Cl.

*E05F 1/08* (2006.01)
*E05F 1/12* (2006.01)

(52) U.S. Cl.

CPC ....... *E05F 1/1215* (2013.01); *E05Y 2900/132* (2013.01)

(58) Field of Classification Search

CPC .. A47F 3/043; A47F 3/0434; A47F 2003/008; E05F 1/1215; E05F 1/12; E05F 1/1016; E05F 3/20; E05F 1/1223; E05F 1/1008; E05F 1/1025; E05F 1/1207; E05F 1/14; E05D 7/081; E05D 7/0009; E05Y 2201/21; E05Y 2201/25; E05Y 2201/484; E05Y 2201/492; E05Y 2201/496; E05Y 2201/702; E05Y 2201/704; E05Y 2201/71; E05Y 2900/20; E05Y 2900/202; E05Y 2900/30

USPC .......................................... 16/298, 299, 301

See application file for complete search history.

(56) References Cited

U.S. PATENT DOCUMENTS

| | | | | | |
|---|---|---|---|---|---|
| 3,825,973 | A * | 7/1974 | Gwozdz | E05F 1/1215 16/300 |
| 4,073,038 | A * | 2/1978 | Curry | E05F 1/1215 16/50 |
| 4,583,262 | A * | 4/1986 | Werner | E05F 1/1215 16/300 |
| 4,870,716 | A * | 10/1989 | Grass | E05D 5/0276 16/250 |
| 5,048,155 | A * | 9/1991 | Hwang | E05F 1/1215 16/301 |

(Continued)

FOREIGN PATENT DOCUMENTS

| | | | | |
|---|---|---|---|---|
| EP | 0269701 B2 * | 7/1994 | | |
| EP | 2447454 A2 * | 5/2012 | E05D 11/0054 | |

(Continued)

*Primary Examiner* — Chuck Y Mah

(57) ABSTRACT

The present disclosure provides an automatic reset device for a door. The automatic reset device for a door includes a first connecting component, a second connecting component and an elastic reset member. The first connecting component is configured to be connected to a surface of a rotating door. The second connecting component is configured to be connected to a supporting surface close to a rotating shaft of the rotating door, and the second connecting component is provided with an adjustment component. The first connecting component and the second connecting component are rotatably connected to each other. A first end of the elastic reset member is connected to the first connecting component, and a second end of the elastic reset member is connected to the adjustment component. The first connecting component is stressed to rotate relative to the second connecting component.

14 Claims, 9 Drawing Sheets

(56) References Cited

U.S. PATENT DOCUMENTS

| | | | | | |
|---|---|---|---|---|---|
| 6,460,220 | B1 * | 10/2002 | Jackson | E05F 1/1215 16/374 |
| 8,020,253 | B1 * | 9/2011 | Finkelstein | E05D 7/1011 16/250 |
| D673,024 | S * | 12/2012 | Caffin | D8/323 |
| D719,809 | S * | 12/2014 | Mitchell | D8/328 |
| 8,955,194 | B2 * | 2/2015 | Teta | E05F 1/006 16/222 |
| 11,078,702 | B2 * | 8/2021 | Babikian | E05D 5/10 |
| 2003/0014839 | A1 * | 1/2003 | Wu | E05F 1/1215 16/298 |
| 2003/0233731 | A1 * | 12/2003 | Cotton | E05D 11/0054 16/250 |
| 2006/0130276 | A1 * | 6/2006 | Clark | E05F 1/1215 16/299 |
| 2010/0088850 | A1 * | 4/2010 | Dringenberg | E05D 11/0054 16/251 |
| 2011/0239406 | A1 * | 10/2011 | Macernis | E05F 1/1215 16/354 |
| 2014/0215923 | A1 * | 8/2014 | Gompper | E05D 7/04 16/235 |
| 2017/0362870 | A1 * | 12/2017 | Vera | E05F 1/1215 |

FOREIGN PATENT DOCUMENTS

| | | | | |
|---|---|---|---|---|
| FR | 3042213 | A1 * | 4/2017 | |
| GB | 2381291 | A * | 4/2003 | E05D 11/0054 |

* cited by examiner

AUTOMATIC RESET DEVICE FOR DOOR

FIELD

The present disclosure relates to the technical field of door control devices, and in particular, to an automatic reset device for a door.

BACKGROUND OF THE INVENTION

In daily lives, in consideration of various purposes such as theft prevention, fire protection, and convenience, people often need to use door control devices to automatically reset doors to their initial positions. The most common automatic reset device is a door closer.

However, existing automatic reset devices for a door on the market cannot adjust an initial elastic deformation of a spring after mounting. In many cases, a resilience force of the automatic reset device for a door is too low, making it impossible to reset the door in a timely and stable manner. Or, if a resilience force of the automatic reset device for a door is too high, the door would be driven to be reset too fast in a door resetting process. On the one hand, a user easily gets hurt; and on the other hand, the door is easily damaged.

For this purpose, the present disclosure provides an automatic reset device for a door, which can effectively solve the above problems. The automatic reset device for a door has a simple structure and can conveniently adjust the initial elastic deformation of the spring and effectively adjust a door resetting speed and force.

SUMMARY OF THE INVENTION

In order to overcome the shortcomings of the prior art, the present disclosure provides an automatic reset device for a door. The automatic reset device for a door has a simple structure and can conveniently adjust the initial elastic deformation of the spring and effectively adjust a door resetting speed and force.

The technical solution adopted by the present disclosure to solve the technical problem is as follows:

An automatic reset device for a door, including: a first connecting component, wherein the first connecting component is configured to be connected to a surface of a rotating door; a second connecting component, wherein the second connecting component is configured to be connected to a supporting surface close to a rotating shaft of the rotating door, and the second connecting component is provided with an adjustment component; the first connecting component and the second connecting component are rotatably connected to each other; and an elastic reset member, wherein a first end of the elastic reset member is connected to the first connecting component, and a second end of the elastic reset member is connected to the adjustment component; the first connecting component is stressed to rotate relative to the second connecting component, and the elastic reset member generates an elastic deformation and causes the first connecting component to have a trend of being reset, wherein the adjustment component is configured to drive the elastic reset member to increase or decrease the elastic deformation.

As the improvement of the present disclosure, the adjustment component includes a connector and an actuator; the actuator is rotatably connected to the connector; the connector is connected to the second connecting component; the actuator is connected to the second end of the elastic reset member; and the actuator drives the elastic reset member to increase or decrease the elastic deformation when rotating relative to the connector.

As the improvement of the present disclosure, a first ratchet wheel part is arranged on a connection surface of the connector to the actuator, and a second ratchet wheel part is arranged on a connection surface of the actuator to the connector; and the first ratchet wheel part cooperates with the second ratchet wheel part to allow relative rotation between the connector and the actuator in a first circumferential direction and to hinder relative rotation between the connector and the actuator in a second circumferential direction.

As the improvement of the present disclosure, the connector is provided with a through hole, and the actuator is provided with a coupling part; the coupling part is arranged opposite to the through hole; the coupling part is configured to be coupled with a working end of a twisting tool; and the through hole is configured to allow the working end of the twisting tool to pass through for use.

As the improvement of the present disclosure, the first connecting component is provided with a first shaft hole and a first rotating shaft; the second connecting component is provided with a second shaft hole; at least part of the adjustment component is arranged in a columnar shape to form a second rotating shaft; the second rotating shaft is rotatably inserted into the first shaft hole; the first rotating shaft is rotatably inserted into the second shaft hole; and the first rotating shaft, the second rotating shaft, the first shaft hole, and the second shaft hole are all coaxial to allow relative rotation between the first connecting component and the second connecting component.

As the improvement of the present disclosure, the elastic reset member is a torsional spring; the torsional spring is inserted into the first shaft hole; a first clamping part is arranged at a lower part of the actuator; a second clamping part is arranged at an upper part of the first rotating shaft; and one end of the torsional spring is clamped to the first clamping part, and the other end of the torsional spring is clamped to the second clamping part.

As the improvement of the present disclosure, the second shaft hole includes an upper shaft hole unit and a lower shaft hole unit; the upper shaft hole unit and the lower shaft hole unit are opposite and coaxial; the connector is connected to the upper shaft hole unit, so that the connector and the upper shaft hole unit form a whole; part of the first rotating shaft is inserted into and fixedly connected to one end of the first shaft hole, so that the first rotating shaft and the first shaft hole form a whole; the first rotating shaft is rotatably inserted into the lower shaft hole unit; and the second rotating shaft formed by at least part of the adjustment component is rotatably inserted into the other end of the first shaft hole.

As the improvement of the present disclosure, the automatic reset device for the door further includes a first limiting column, wherein the first rotating shaft is provided with an insertion hole; the first connecting component is provided with a first through hole penetrating through a side wall of the first through hole; and the first limiting column is inserted into the insertion hole through the first through hole.

As the improvement of the present disclosure, a limiting block is arranged on an outer surface of the connector; a limiting slot is arranged on an inner wall of the upper shaft hole unit; and the limiting block is inserted into the limiting slot.

As the improvement of the present disclosure, the automatic reset device for the door further includes a second limiting column, wherein an insertion slot is arranged on a surface of the connector; the second connecting component is provided with a second through hole penetrating through a side wall of the upper shaft hole unit; and the second limiting column is inserted into the insertion slot through the second through hole.

As the improvement of the present disclosure, the automatic reset device for the door further includes two gaskets, wherein the two gaskets are respectively located between the first shaft hole and the upper shaft hole unit and between the first shaft hole and the lower shaft hole unit.

As the improvement of the present disclosure, the first connecting component includes a mounting plate; the mounting plate is provided with several first connecting holes; and the first connecting holes are configured to allow the connector to pass through for use.

As the improvement of the present disclosure, a reinforcing rib is arranged on a surface of the mounting plate; and at least part of the reinforcing rib is arranged around the first connecting holes.

As the improvement of the present disclosure, the first connecting component further includes a cover plate; and the cover plate is covered at one side of the mounting plate facing away from a mounting plane.

As the improvement of the present disclosure, a rotating column is arranged on one side of the mounting plate close to the second connecting component; a rotating slot is arranged on one side of the cover plate close to the second connecting component; and the rotating column is rotatably inserted into the rotating slot.

As the improvement of the present disclosure, the rotating slot includes a sliding chute and a locking slot; the sliding chute is communicated to the locking slot; and the rotating column slides internally along the sliding chute and the locking slot.

As the improvement of the present disclosure, a first locking hole is arranged on one side of the mounting plate facing away from the second connecting component; a second locking hole is arranged on one side of the cover plate far from the second connecting component; the first locking hole and the second locking hole are configured to allow the locking member to pass through for use, so as to fix the mounting plate with the cover plate.

As the improvement of the present disclosure, the second connecting component is provided with a second connecting hole, and the second connecting hole is configured to allow the connector to pass through for use.

As the improvement of the present disclosure, a mounting surface of the first connecting component and a mounting surface of the second connecting component are roughly parallel or perpendicular to each other.

Beneficial effects of the present disclosure are as follows: By the arrangement of the above structure, during use, the first connecting component is connected to the surface of the rotating door, and it is generally connected to a position, close to the rotating shaft, on the surface of the rotating door. The second connecting component is then connected to the supporting surface or mounting surface such as a door frame and a wall surface, and it is generally also connected to a position, close to the rotating shaft of the rotating door, on the supporting surface or mounting surface. Further, an adjustment device is used to drive the elastic reset member to move to increase or decrease the elastic deformation of the elastic reset member, thus adjusting an elastic force of the automatic reset device for the door independently according to a need of a user, making it convenient for the use to use the automatic reset device for the door. Moreover, damage to the rotating door caused by an extremely high resilience force can be prevented, and the influence caused by an extremely low resilience force on the reset effect of the automatic reset device for the door can also be prevented.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
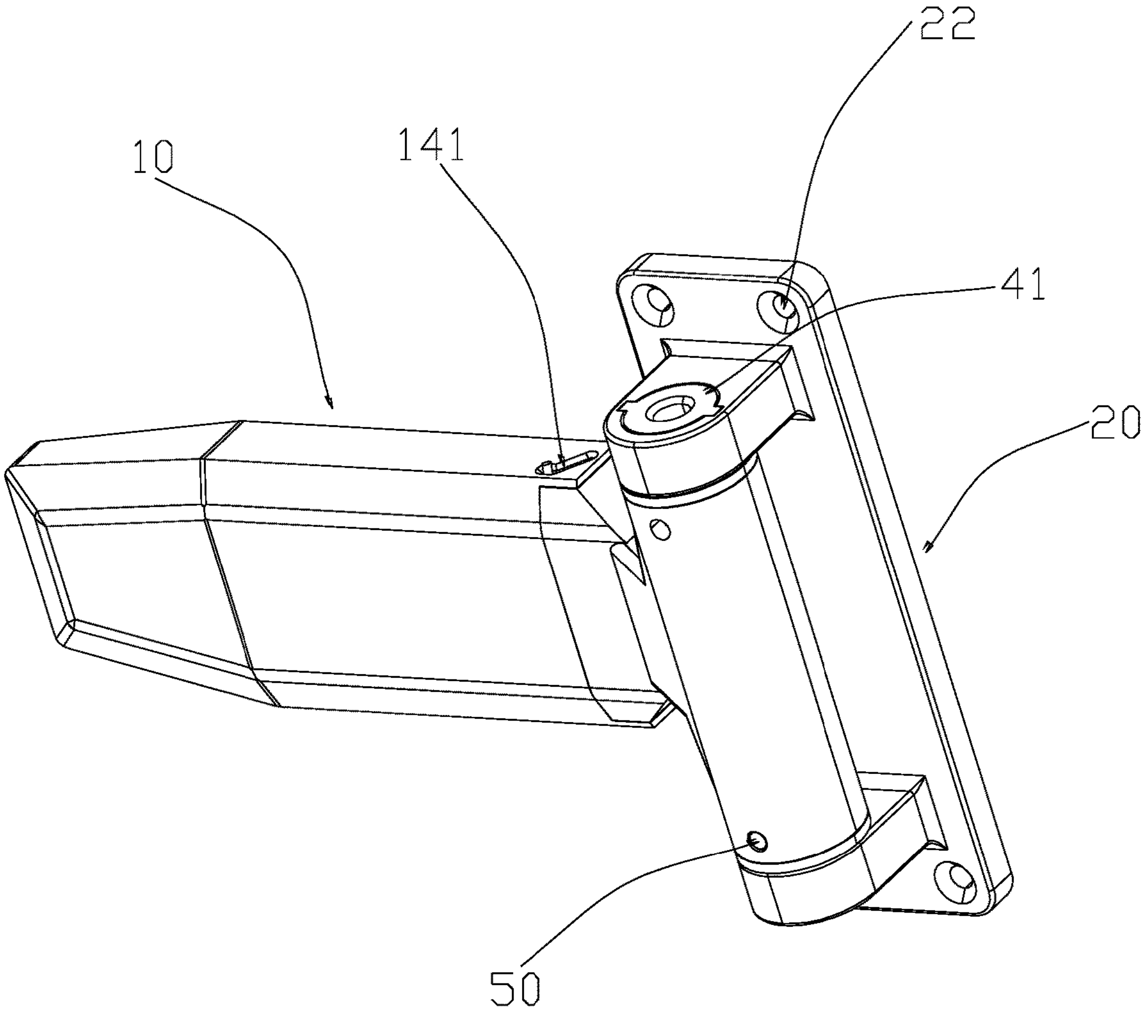
FIG. 1 is a schematic diagram of an entire structure of the present disclosure.
Figure 2:
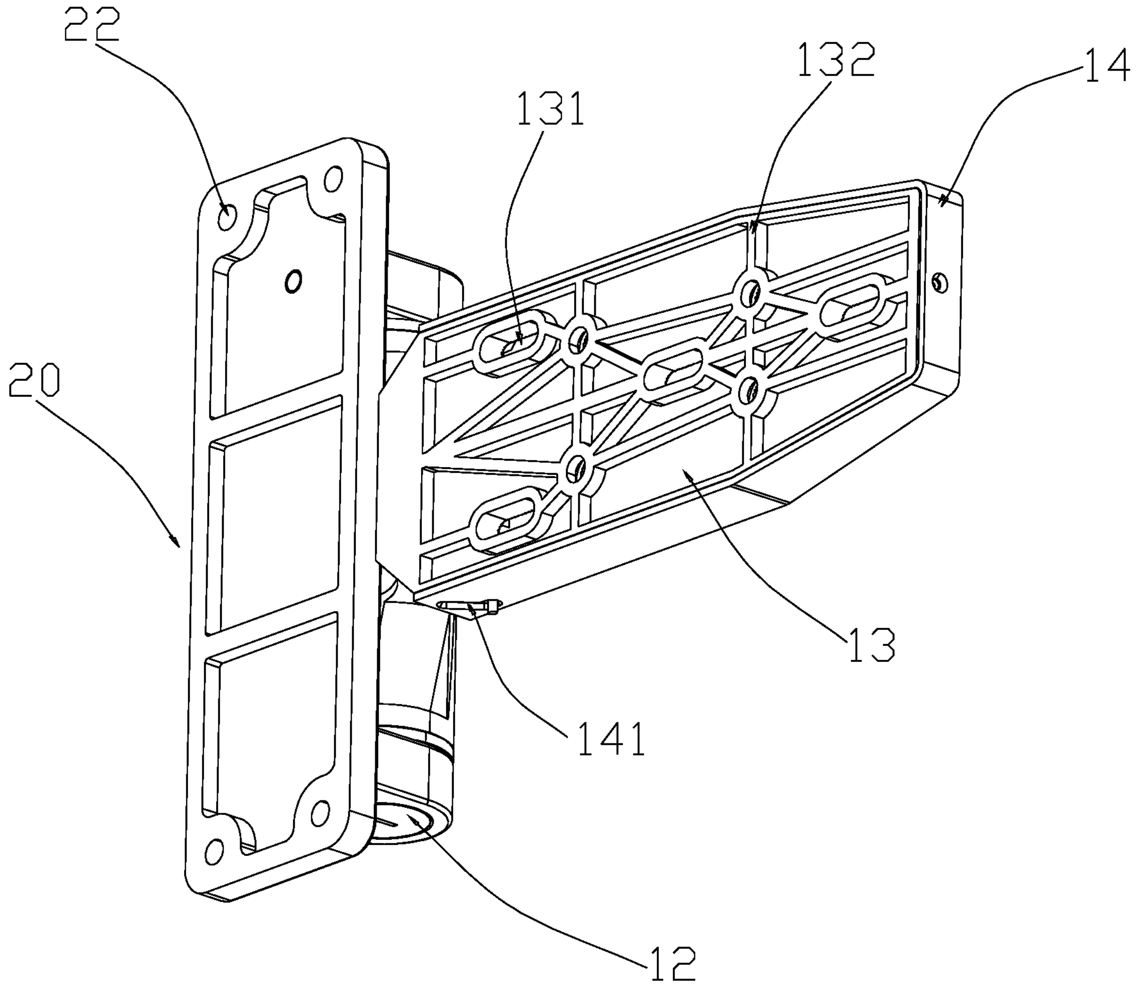
FIG. 2 is a schematic diagram of an entire structure of the present disclosure in another angle.
Figure 3:
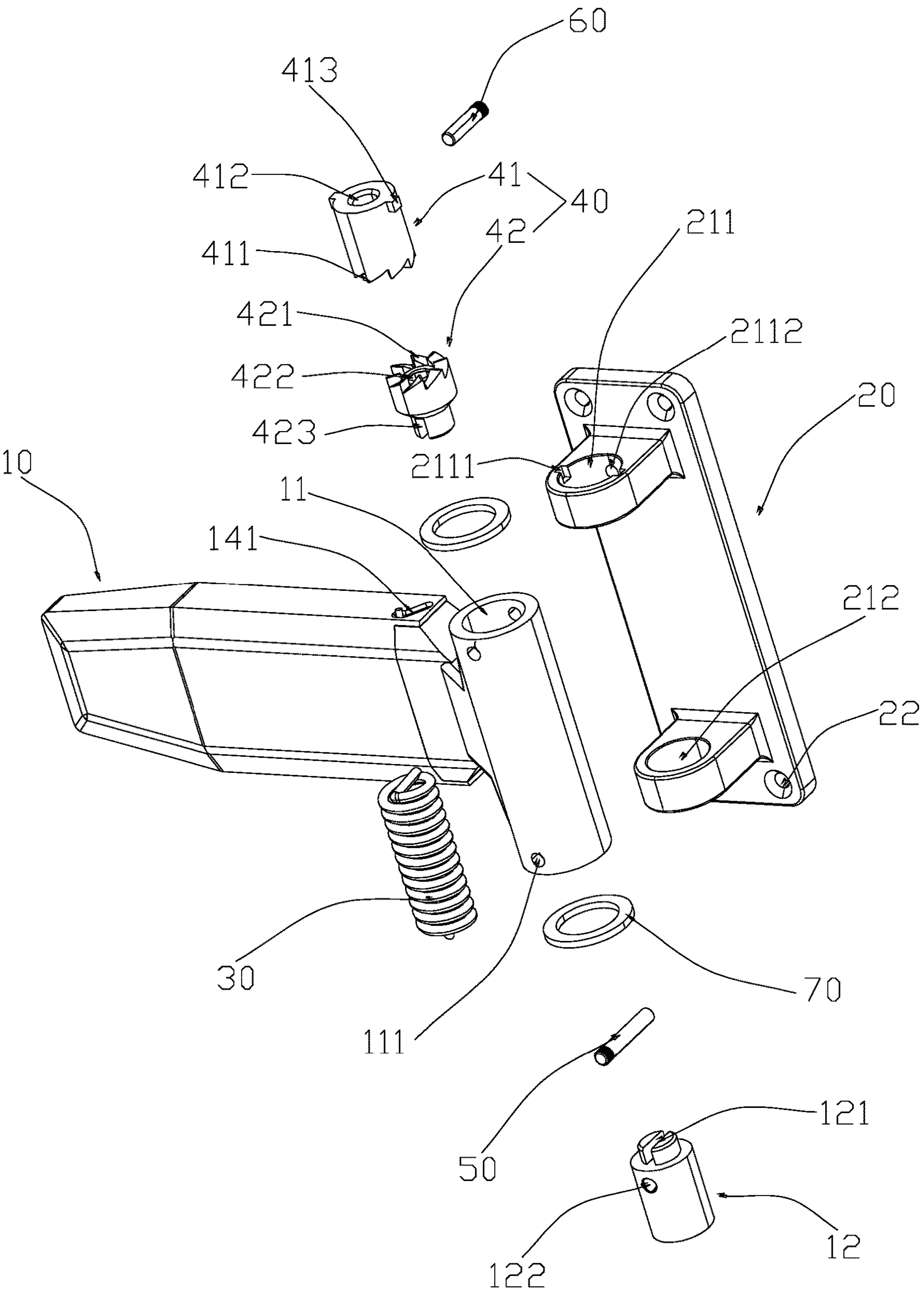
FIG. 3 is a structural exploded diagram of the present disclosure in an angle.
Figure 4:
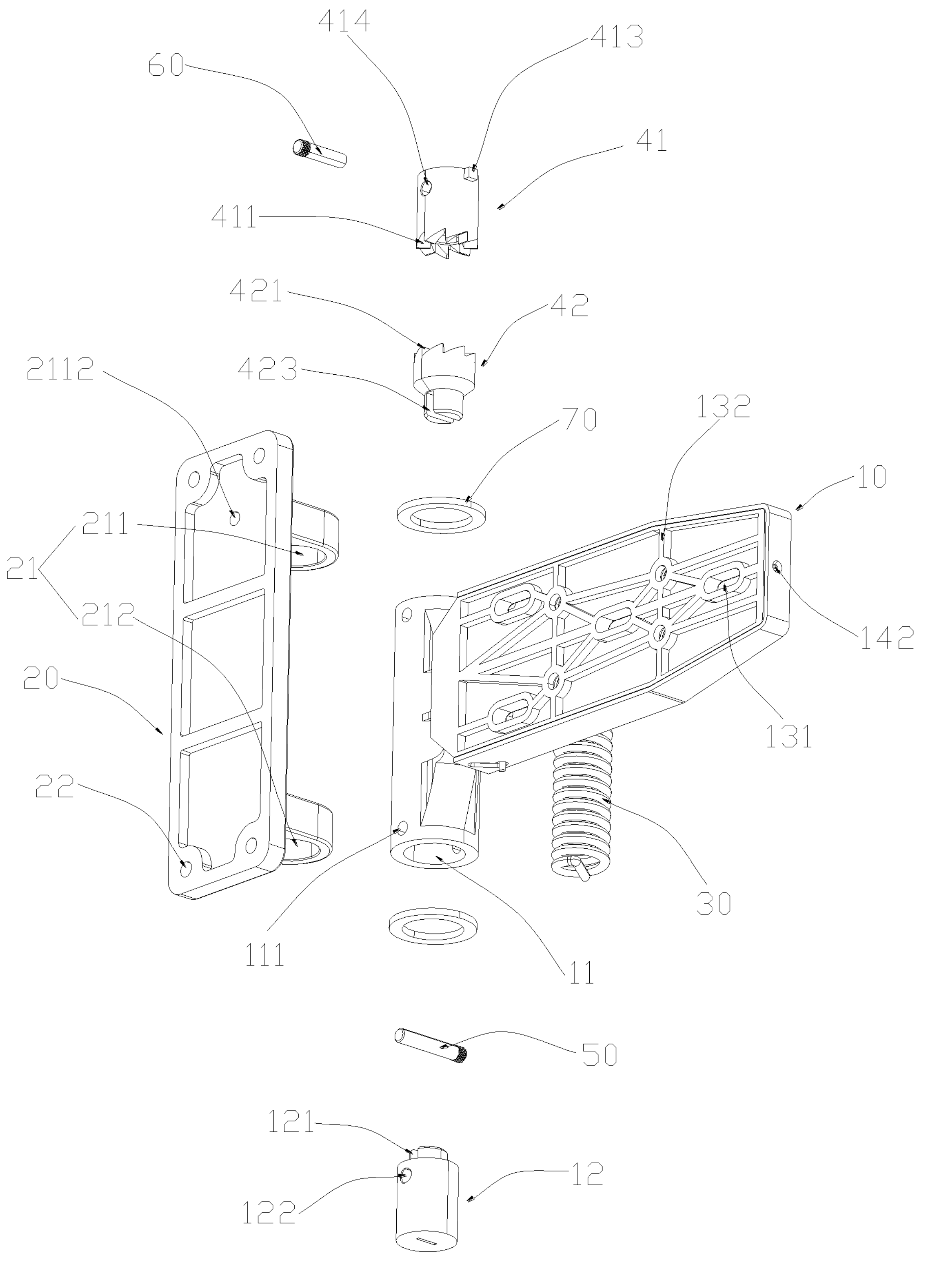
FIG. 4 is a structural exploded diagram of the present disclosure in another angle.
Figure 5:
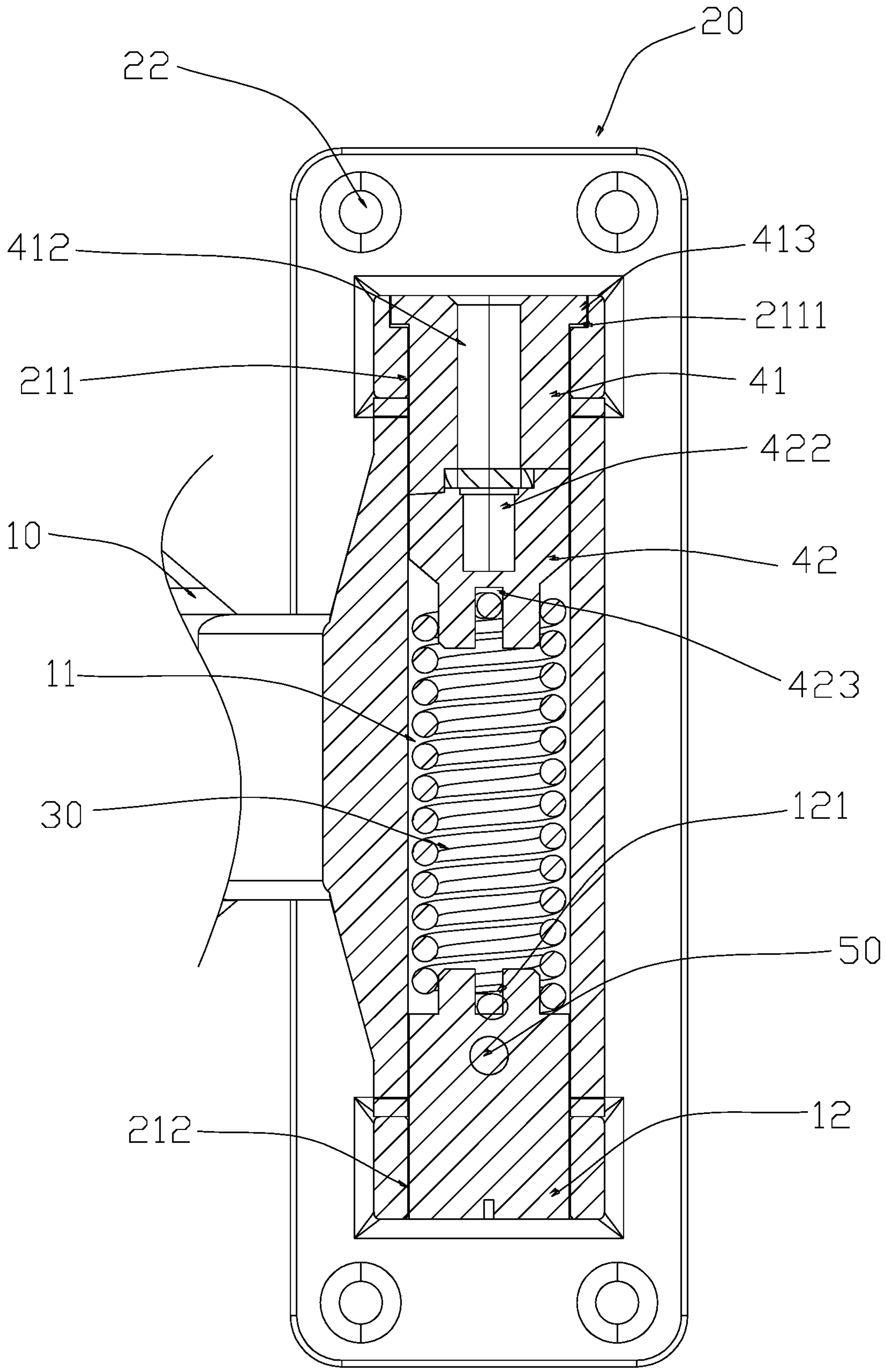
FIG. 5 is a partially sectional view of the present disclosure along a plane.
Figure 6:
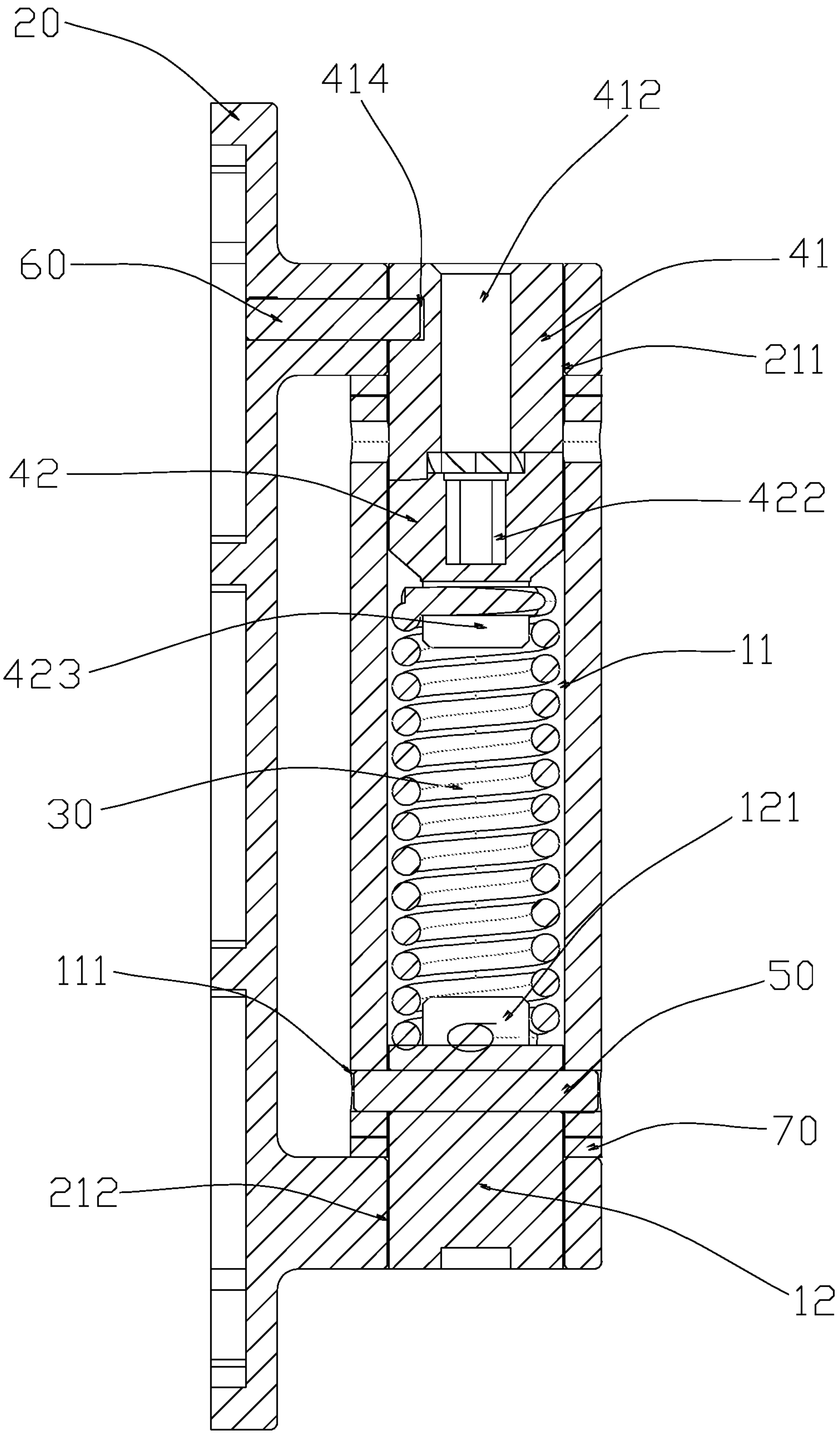
FIG. 6 is a sectional view of the present disclosure along another plane.
Figure 7:
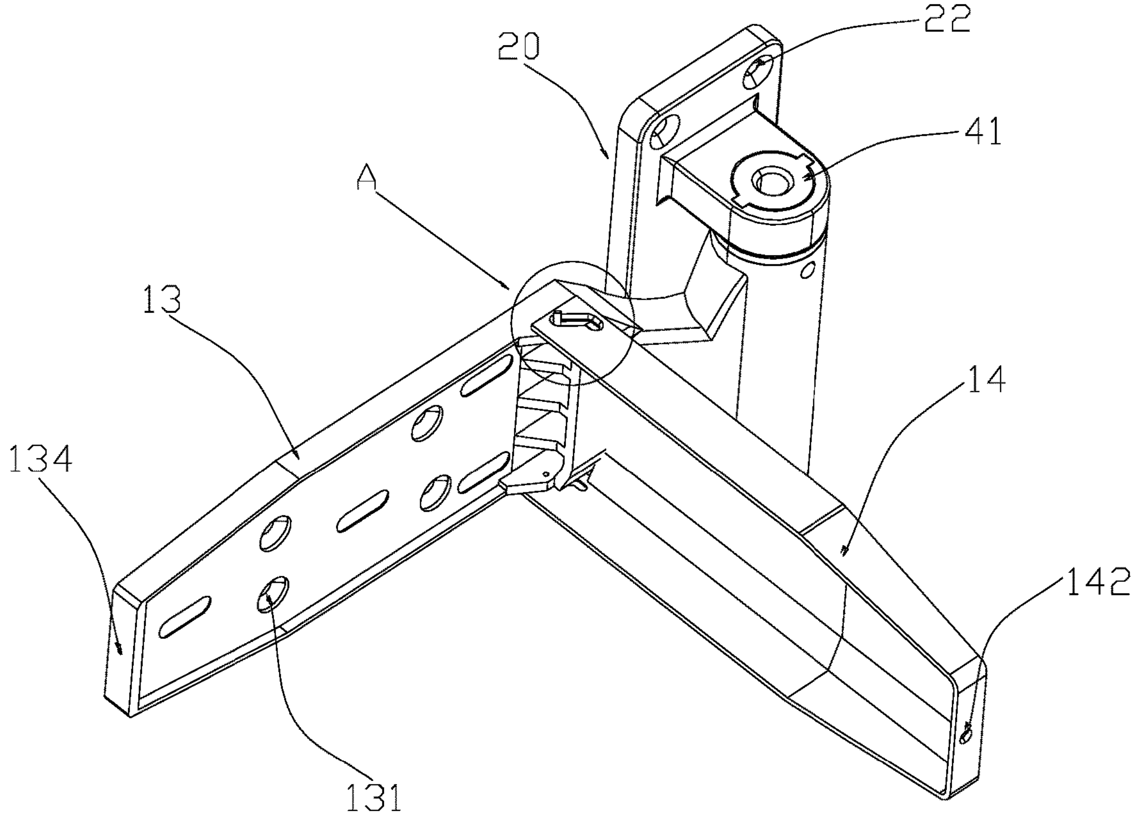
FIG. 7 is a schematic diagram of an opened state of a cover plate of the present disclosure.
Figure 8:
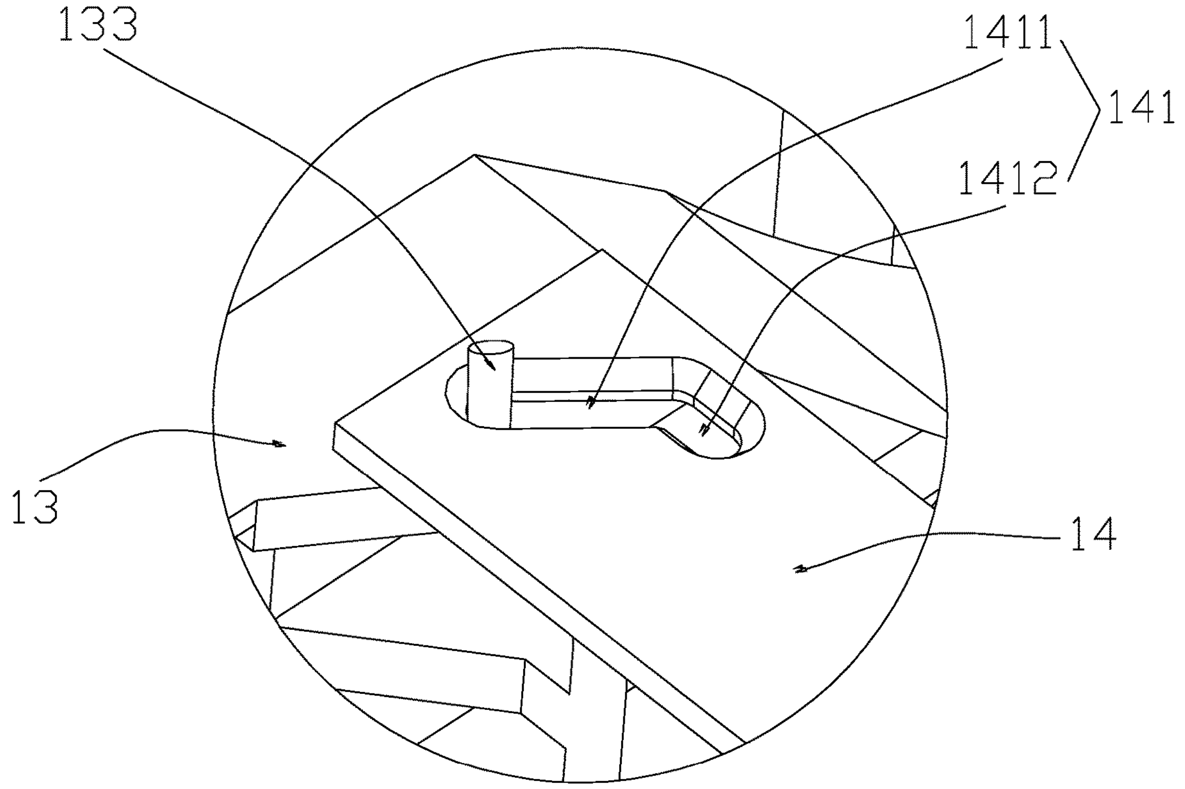
FIG. 8 is an enlarged view of circle A in FIG. 7.
Figure 9:
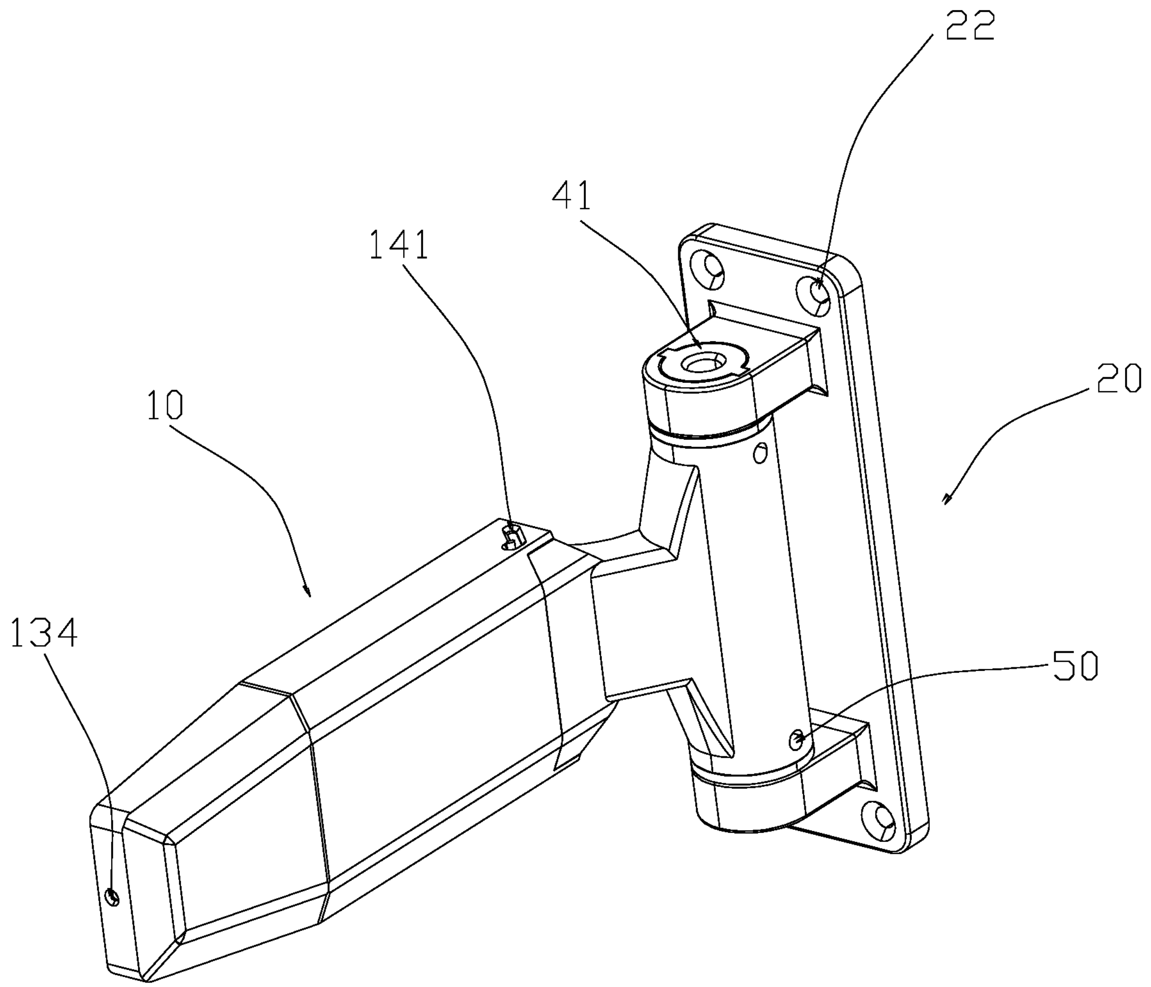
FIG. 9 is a schematic diagram of another mounting state of the present disclosure.

Referring to FIG. 1 to FIG. 9, an automatic reset device for a door includes:

- a first connecting component 10, wherein the first connecting component 10 is configured to be connected to a surface of a rotating door;
- a second connecting component 20, wherein the second connecting component 20 is configured to be connected to a supporting surface close to a rotating shaft of the rotating door, and the second connecting component 20 is provided with an adjustment component 40; the first connecting component 10 and the second connecting component 20 are rotatably connected to each other; and
- an elastic reset member 30, wherein a first end of the elastic reset member 30 is connected to the first connecting component 10, and a second end of the elastic reset member 30 is connected to the adjustment component 40; the first connecting component 10 is stressed to rotate relative to the second connecting component 20, and the elastic reset member 30 generates an elastic deformation and causes the first connecting component 10 to have a trend of being reset,
- wherein the adjustment component 40 is configured to drive the elastic reset member 30 to increase or decrease the elastic deformation.

By the arrangement of the above structure, during use, the first connecting component 10 is connected to the surface of the rotating door, and it is generally connected to a position, close to the rotating shaft, on the surface of the rotating door. The second connecting component 20 is then connected to the supporting surface or mounting surface such as a door frame and a wall surface, and it is generally also connected to a position, close to the rotating shaft of the rotating door, on the supporting surface or mounting surface. Further, an adjustment device is used to drive the elastic reset member to move to increase or decrease the elastic deformation of the elastic reset member, thus adjusting an elastic force of the automatic reset device for the door independently according to a need of a user, making it convenient for the use to use the automatic reset device for the door. Moreover, damage to the rotating door caused by an extremely high resilience force can be prevented, and the influence caused by an extremely low resilience force on the reset effect of the automatic reset device for the door can also be prevented.

In this embodiment, the adjustment component 40 includes a connector 41 and an actuator 42; the actuator 42 is rotatably connected to the connector 41; the connector 41 is connected to the second connecting component 20; the actuator 42 is connected to the second end of the elastic reset member 30; and the actuator 42 drives the elastic reset member 30 to increase or decrease the elastic deformation when rotating relative to the connector 41. By the arrangement of the above structure, the connector 41 can fixedly connect the adjustment component 40 to the second connecting component 20, so that the adjustment component 40 can move synchronously with the second connecting component 20, and thus change a deformation amount of the elastic reset member when the first connecting component 10 and the second connecting component 20 rotate relative to each other, thereby changing the elastic force. When the first connecting component 10 and the second connecting component 20 are relatively stationary, the elastic reset member 30 can be directly driven to increase or decrease the elastic deformation by adjusting the actuator 42, which achieves the purpose of adjusting the magnitude of the resilience force.

In this embodiment, a first ratchet wheel part 411 is arranged on a connection surface of the connector 41 to the actuator 42, and a second ratchet wheel part 421 is arranged on a connection surface of the actuator 42 to the connector 41; and the first ratchet wheel part 411 cooperates with the second ratchet wheel part 421 to allow relative rotation between the connector 41 and the actuator 42 in a first circumferential direction and to hinder relative rotation between the connector 41 and the actuator 42 in a second circumferential direction. By the arrangement of the above structure, the connector 41 and the actuator 42 can rotate in one way relative to each other through the first ratchet wheel part 411 and the second ratchet wheel part 421. The second circumferential direction is the same as a direction of the resilience force of the elastic reset member. This setting can prevent an elastic reset force from driving the connector 41 and the actuator 42 to rotate relative to each other, so that the stability of the elastic reset force of a product is ensured, and the door can be reset stably. On the contrary, the first circumferential direction is opposite to the direction of the resilience force of the elastic reset member, that is, during the relative rotation between the connector 41 and the actuator 42 in the first circumferential direction, the deformation amount of the elastic reset member can be increased, thereby increasing the resilience force of the elastic reset member.

In this embodiment, the connector 41 is provided with a through hole 412, and the actuator 42 is provided with a coupling part 422; the coupling part 422 is arranged opposite to the through hole 412; the coupling part 422 is configured to be coupled with a working end of a twisting tool; and the through hole 412 is configured to allow the working end of the twisting tool to pass through for use. By the arrangement of the above structure, during use, the working end of the twisting tool, for example, a tool bit of a screwdriver, passes through the through hole and is coupled to the coupling part, so that the actuator can be driven to rotate by rotating the screwdriver, and the resilience force of the elastic reset member is conveniently adjusted, making it convenient for use. The coupling part can be an inner hexagon screw hole.

In this embodiment, the first connecting component 10 is provided with a first shaft hole 11 and a first rotating shaft 12; the second connecting component 20 is provided with a second shaft hole 21; at least part of the adjustment component 40 is arranged in a columnar shape to form a second rotating shaft; the second rotating shaft is rotatably inserted into the first shaft hole 11; the first rotating shaft 12 is rotatably inserted into the second shaft hole 21; and the first rotating shaft 12, the second rotating shaft, the first shaft hole 11, and the second shaft hole 21 are all coaxial to allow relative rotation between the first connecting component 10 and the second connecting component 20. By the arrangement of the above structure, during use, the first rotating shaft 12, the second rotating shaft, the first shaft hole 11, and the second shaft hole 21 are coaxial, which can ensure that the first connecting component 10 and the second connecting component 20 can rotate around the same axis, so that the first connecting component 10 and the second connecting component 20 are stably rotatably connected to each other.

In this embodiment, the elastic reset member 30 is a torsional spring; the torsional spring is inserted into the first shaft hole 11; a first clamping part 423 is arranged at a lower part of the actuator 42; a second clamping part 121 is arranged at an upper part of the first rotating shaft 12; and one end of the torsional spring is clamped to the first clamping part 423, and the other end of the torsional spring is clamped to the second clamping part 121. By the arrangement of the above structure, use of the torsional spring as the elastic reset member is more suitable for storing elastic potential energy during rotation, and the cost is low. The torsional spring is inserted into the first shaft hole 11, which can effectively limit the torsional spring when the torsional spring deforms and further ensure the stability of the product. Furthermore, the torsional spring can be effectively hidden, the aesthetics and safety of the product can be improved, and the user can be prevented from being pinched when the torsional spring deforms. Two ends of the torsional spring are respectively connected to the first clamping part 423 and the second clamping part 121, which can achieve connections between the torsional spring and the first connecting component 10, as well as between the torsional spring and the second connecting component 20, and provide a restoring force for the first connecting component 10 and the second connecting component 20. Moreover, when the user adjusts the actuator 42, the torsional spring will also deform in a vertical direction to allow the second ratchet wheel part 421 to slide along a surface of the first ratchet wheel part 411, making it convenient for the user to adjust the actuator 42.

In this embodiment, the second shaft hole 21 includes an upper shaft hole unit 211 and a lower shaft hole unit 212; the upper shaft hole unit 211 and the lower shaft hole unit 212 are opposite and coaxial; the connector 41 is connected to the upper shaft hole unit 211, so that the connector 41 and the upper shaft hole unit 211 form a whole; part of the first rotating shaft 12 is inserted into and fixedly connected to one end of the first shaft hole 11, so that the first rotating shaft 12 and the first shaft hole 11 form a whole; the first rotating shaft 12 is rotatably inserted into the lower shaft hole unit 212; and the second rotating shaft formed by at least part of the adjustment component 40 is rotatably inserted into the other end of the first shaft hole 11. By the arrangement of the above structure, the upper shaft hole unit 211 and the lower shaft hole unit 212 are respectively configured to cooperate with the first rotating shaft and the second rotating shaft, which can ensure that both ends of the component where the first shaft hole is located can be stressed to ensure that the first connecting component 10 and the second connecting component 20 are stably rotatably connected to each other.

In this embodiment, the automatic reset device for the door further includes a first limiting column 50; the first rotating shaft 12 is provided with an insertion hole 122; the first connecting component 10 is provided with a first through hole 111 penetrating through a side wall of the first through hole 11; and the first limiting column 50 is inserted into the insertion hole 122 through the first through hole 111. By the arrangement of the above structure, the first limiting column 50 is inserted into the insertion hole 122 through the first through hole 111, which can connect the component with the first rotating shaft 12 to the component with the first shaft hole 11 to form a whole. The structure is simple, and the mounting is convenient. Preferably, a thread is arranged on an inner wall of the first through hole 111. The thread is matched with a thread at a tail end of the first limiting column 50 to stably connect the first limiting column 50 to the first through hole 111 and the insertion hole 122, so that separation of the first limiting column 50 is prevented, and the stability of the product is ensured.

In this embodiment, a limiting block 413 is arranged on an outer surface of the connector 41; a limiting slot 2111 is arranged on an inner wall of the upper shaft hole unit 211; and the limiting block 413 is inserted into the limiting slot 2111. By the cooperation between the limiting block 413 and the limiting slot 2111, movement of the connector 41 in a circumferential direction of the upper shaft hole unit 211 can be prevented. When the user adjusts the torsional spring through the actuator, fixed connection between the connector and the second connector 20 can be ensured, and the stability of the product can be improved.

In this embodiment, the automatic reset device for the door further includes a second limiting column 60; an insertion slot 414 is arranged on a surface of the connector 41; the second connecting component 20 is provided with a second through hole 2112 penetrating through a side wall of the upper shaft hole unit 211; and the second limiting column 60 is inserted into the insertion slot 414 through the second through hole 2112. By the arrangement of the above structure, during use, the second limiting column 60 is inserted into the insertion slot 414 through the second through hole 2112, which can further fix the connector 41 and the second connecting component 20 to form a whole, so as to prevent movement of the connector 41 in an axial direction of the upper shaft hole unit 211, and improve the stability of the product.

In this embodiment, the automatic reset device for the door further includes two gaskets 70; the two gaskets 70 are respectively located between the first shaft hole 11 and the upper shaft hole unit 211 and between the first shaft hole 11 and the lower shaft hole unit 212. By the arrangement of the above structure, the gaskets 70 can effectively protect the components with the rotating shafts and the shaft holes. Friction is reduced, so that the relative rotation between the first connecting component 10 and the second connecting component 20 is smoother, and the service life of the product can be prolonged.

In this embodiment, the first connecting component 10 includes a mounting plate 13; the mounting plate 13 is provided with several first connecting holes 131; and the first connecting holes 131 are configured to allow the connector to pass through for use. By the arrangement of the above structure, during use, connectors such as screws are used to pass through the first connecting holes 131 to fix and connect the first connecting component to a surface of the door, which can achieve convenient mounting and use of the product.

In this embodiment, a reinforcing rib 132 is arranged on a surface of the mounting plate 13; and at least part of the reinforcing rib 132 is arranged around the first connecting holes 131. By the arrangement of the above structure, the reinforcing rib 132 can improve the strength of the product, while part of the reinforcing rib 132 is arranged around the first connecting holes 131, which can improve the strength of the product at the first connecting holes 131 and further ensure the stability of the product.

In this embodiment, the first connecting component 10 further includes a cover plate 14; and the cover plate 14 is covered at one side of the mounting plate 13 facing away from a mounting plane. By the arrangement of the above structure, the cover plate 14 can be covered at the mounting plate 13. This can cover the mounting plate and the connector such as a screw on the mounting plate, and maintain the stability and aesthetics of the product.

In this embodiment, a rotating column 133 is arranged on one side of the mounting plate 13 close to the second connecting component 20; a rotating slot 141 is arranged on one side of the cover plate 14 close to the second connecting component 20; and the rotating column 133 is rotatably inserted into the rotating slot 141. By the arrangement of the above structure, the rotatable connection between the mounting plate 13 and the cover plate 14 can be achieved through the cooperation between the rotating column 133 and the rotating slot 141 during use, which further facilitates the user to open the cover plate 14 during mounting and facilitates use.

In this embodiment, the rotating slot 141 includes a sliding chute 1411 and a locking slot 1412; the sliding chute 1411 is communicated to the locking slot 1412; and the rotating column 133 can slide internally along the sliding chute 1411 and the locking slot 1412. By the arrangement of the above structure, when the cover plate 14 is opened, the user can move the cover plate 14 to slide the rotating column 133 from the locking slot 1412 to a tail end of the sliding chute 1411, and reserve a space between the cover plate 14 and the mounting plate 13 to allow the relative rotation between the cover plate 14 and the mounting plate 13. When the cover plate 14 is closed, the user can move the cover plate 14 to close the mounting plate 13, and can then slide the rotating column 133 from the tail end of the sliding chute 1411 to the locking slot 1412, so that the cover plate 14 is in close fit with the mounting plate 13 to improve the leakproofness between the cover plate 14 and the mounting plate 13.

In this embodiment, a first locking hole 134 is arranged on one side of the mounting plate 13 facing away from the second connecting component 20; a second locking hole 142 is arranged on one side of the cover plate 14 far from the second connecting component 20; the first locking hole 134 and the second locking hole 142 are configured to allow the locking member to pass through for use, so as to fix the mounting plate 13 with the cover plate 14. By the arrangement of the above structure, when the cover plate 14 is covered at the mounting plate 13, locking members such as screws are used to pass through the first locking hole 134 and the second locking hole 142 to fixedly connect the cover plate 14 to the mounting plate 13, which further improves the stability of the product and prevents the cover plate 14 from being separated from the mounting plate 13.

In this embodiment, the second connecting component 20 is provided with a second connecting hole 22, and the second connecting hole 22 is configured to allow the connector to pass through for use. By the arrangement of the above structure, during use, the user can thread the connector such as a screw to through the second connecting hole 22 and mount the second connecting component 20 on the mounting plane such as a door frame and a wall surface.

In this embodiment, a mounting surface of the first connecting component 10 and a mounting surface of the second connecting component 20 are roughly parallel or perpendicular to each other. By the arrangement of the above structure, the automatic reset device for the door can be adapted to different mounting scenarios. For example, in a case that the mounting plane such as a door frame and a wall surface is parallel or perpendicular to the surface of the rotating door, the automatic reset device for the door can be used.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

The invention claimed is:

1. An automatic reset device for a door, comprising:

a first connecting component, wherein the first connecting component is configured to be connected to a surface of a rotating door;

a second connecting component rotatably connected to the first connecting component, wherein the second connecting component is provided with an adjustment component; and an elastic reset member, wherein a first end of the elastic reset member is connected to the first connecting component, and a second end of the elastic reset member is connected to the adjustment component; the first connecting component is stressed to rotate relative to the second connecting component, and the elastic reset member generates an elastic deformation and causes the first connecting component to have a resetting trend, wherein the adjustment component is configured to drive the elastic reset member to increase or decrease the elastic deformation, and the adjustment component comprises a connector and an actuator, the actuator is rotatably connected to the connector, the connector is connected to the second connecting component, the actuator is connected to the second end of the elastic reset member, and the actuator drives the elastic reset member to increase or decrease the elastic deformation when rotating relative to the connector;

wherein a first ratchet wheel part is arranged on a connection surface of the connector to the actuator, and a second ratchet wheel part is arranged on a connection surface of the actuator to the connector; and the first ratchet wheel part cooperates with the second ratchet wheel part to allow relative rotation between the connector and the actuator in a first circumferential direction and to hinder relative rotation between the connector and the actuator in a second circumferential direction;

wherein the connector is provided with a through hole, and the actuator is provided with a coupling part; the coupling part is arranged opposite to the through hole; the coupling part is configured to be coupled with a working end of a twisting tool; and the through hole is configured to allow the working end of the twisting tool to pass through for use; and wherein the first connecting component is provided with a first shaft hole and a first rotating shaft; the second connecting component is provided with a second shaft hole; at least part of the adjustment component is arranged in a columnar shape to form a second rotating shaft; the second rotating shaft is rotatably inserted into the first shaft hole; the first rotating shaft is rotatably inserted into the second shaft hole;

and the first rotating shaft, the second rotating shaft, the first shaft hole, and the second shaft hole are all coaxial to allow relative rotation between the first connecting component and the second connecting component.

2. The automatic reset device for the door according to claim 1, wherein the elastic reset member is a torsional spring; the torsional spring is inserted into the first shaft hole; a first clamping part is arranged at a lower part of the actuator; a second clamping part is arranged at an upper part of the first rotating shaft; and one end of the torsional spring is clamped to the first clamping part, and the other end of the torsional spring is clamped to the second clamping part.

3. The automatic reset device for the door according to claim 1, wherein the second shaft hole comprises an upper shaft hole unit and a lower shaft hole unit; the upper shaft hole unit and the lower shaft hole unit are opposite and coaxial; the connector is connected to the upper shaft hole unit, so that the connector and the upper shaft hole unit form a whole; part of the first rotating shaft is inserted into and fixedly connected to one end of the first shaft hole, so that the first rotating shaft and the first shaft hole form a whole; the first rotating shaft is rotatably inserted into the lower shaft hole unit; and the second rotating shaft formed by at least part of the adjustment component is rotatably inserted into the other end of the first shaft hole.

4. The automatic reset device for the door according to claim 3, further comprising a first limiting column, wherein the first rotating shaft is provided with an insertion hole; the first connecting component is provided with a first through hole penetrating through a side wall of the first shaft hole; and the first limiting column is inserted into the insertion hole through the first through hole.

5. The automatic reset device for the door according to claim 3, wherein a limiting block is arranged on an outer surface of the connector; a limiting slot is arranged on an inner wall of the upper shaft hole unit; and the limiting block is inserted into the limiting slot.

6. The automatic reset device for the door according to claim 3, further comprising a second limiting column, wherein an insertion slot is arranged on a surface of the connector; the second connecting component is provided with a second through hole penetrating through a side wall of the upper shaft hole unit; and the second limiting column is inserted into the insertion slot through the second through hole.

7. The automatic reset device for the door according to claim 3, further comprising two gaskets, wherein the two gaskets are respectively located between the first shaft hole and the upper shaft hole unit and between the first shaft hole and the lower shaft hole unit.

8. The automatic reset device for the door according to claim 3, wherein the first connecting component comprises a mounting plate; the mounting plate is provided with several screw connecting holes.

9. The automatic reset device for the door according to claim 8, wherein a reinforcing rib is arranged on a surface of the mounting plate; and at least part of the reinforcing rib is arranged around the first connecting holes.

10. The automatic reset device for the door according to claim 8, wherein the first connecting component further comprises a cover plate; and the cover plate is covered at one side of the mounting plate facing away from a mounting plane.

11. The automatic reset device for the door according to claim 10, wherein a rotating column is arranged on one side of the mounting plate close to the second connecting component; a rotating slot is arranged on one side of the cover plate close to the second connecting component; and the rotating column is rotatably inserted into the rotating slot.

12. The automatic reset device for the door according to claim 11, wherein the rotating slot comprises a sliding chute and a locking slot; the sliding chute is communicated to the locking slot; and the rotating column slides internally along the sliding chute and the locking slot.

13. The automatic reset device for the door according to claim 11, wherein a first locking hole is arranged on one side of the mounting plate facing away from the second connecting component; a second locking hole is arranged on one side of the cover plate far from the second connecting component; the first locking hole and the second locking hole are configured to allow a locking member to pass through for use, so as to fix the mounting plate with the cover plate.

14. The automatic reset device for the door according to claim 1, wherein the second connecting component is provided with a second connecting hole, and the second connecting hole is configured to allow the connector to pass through for use.

* * * * *